Figure 1:
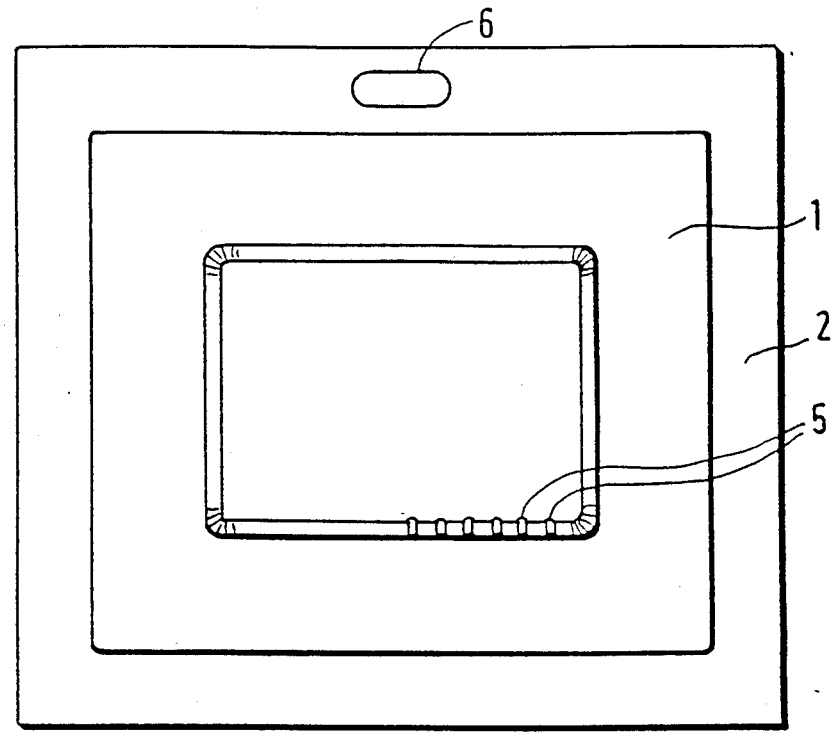

United States Patent [19]

Humbert

[11] Patent Number: 4,850,488
[45] Date of Patent: Jul. 25, 1989

[54] BLISTER PACK FOR PRESENTATION OF AN ARTICLE HAVING OPTO-ELECTRONIC INFORMATION THEREON

[76] Inventor: Bernard M. M. Humbert, 901 Elmgrove Rd., Rochester, N.Y. 14653

[21] Appl. No.: 276,507

[22] PCT Filed: Mar. 17, 1987

[86] PCT No.: PCT/EP87/00153
§ 371 Date: Sep. 6, 1988
§ 102(e) Date: Sep. 6, 1988

[87] PCT Pub. No.: WO87/05882
PCT Pub. Date: Oct. 8, 1987

[30] Foreign Application Priority Data

Mar. 27, 1986 [JP] Japan ..................................... 61-4423

[51] Int. Cl.⁴ ............................................. B65D 25/54
[52] U.S. Cl. ....................................... 206/459; 40/312; 206/45.31; 206/461; 235/487
[58] Field of Search ........................ 206/459, 461–471, 206/497, 45.31, 45.33, 45.34; 40/312, 486, 661; 235/487, 488

[56] References Cited

U.S. PATENT DOCUMENTS

| 3,358,824 | 12/1967 | Stagnitto | 206/459 |
| 3,523,863 | 8/1970 | Juhos | 206/45.33 |
| 3,688,088 | 8/1972 | Brown et al. | 235/487 X |
| 3,711,683 | 1/1973 | Hamisch, Sr. | 235/487 |
| 3,836,754 | 9/1974 | Toye et al. | 235/487 X |
| 4,066,873 | 1/1978 | Schutz | 235/487 |
| 4,221,217 | 1/1988 | Phillips et al. | 206/459 X |
| 4,385,693 | 5/1983 | Gelardi et al. | 206/459 X |
| 4,669,611 | 6/1987 | Flaherty | 206/459 X |
| 4,771,888 | 9/1988 | Lundeen | 206/459 X |

FOREIGN PATENT DOCUMENTS 2536368 5/1984 France ................................ 206/459

Primary Examiner—Bryon P. Gehman

[57] ABSTRACT

Blister type packaging. The receptacle according to the present invention comprises a transparent shell (1) fastened onto card (2), so as to contain an article (3) bearing a bar code (4). The reading of this code by optoelectronic means through the shell is distorted by ribbings (5) formed on shell (1), facing the code. Thus any confusion between code (4) which is rendered unreadable, and another bar code printed elsewhere on a receptacle is avoided. Application of the present invention is to the blister packaging of boxes of photographic or cinema film which have printed thereon an identification bar code.

6 Claims, 1 Drawing Sheet

U.S. Patent

Jul. 25, 1989

4,850,488

BLISTER PACK FOR PRESENTATION OF AN ARTICLE HAVING OPTO-ELECTRONIC INFORMATION THEREON

The present invention relates to a receptacle for displaying articles and more particularly to a blister pack for presentation of an article, bearing information readable by opto-electronic devices.

Many articles are now packed in forms facilitating their commercial distribution. Modern distribution techniques make wise use of blister type packs. In such cases the article to be sold is placed in a housing such as a shell, a bubble or an alveolus made of transparent plastic material, said housing being fastened onto a rigid or semi-rigid card plate or plaque, e.g. of cardboard, to facilitate the hanging of the whole on a display shell. Thus customers of a store equipped with such display shelves can examine and recognize the article contained within the transparent housing. Various characteristics of the article such as its price, possibly its expiry date, its mode of use and techynical features, etc. appear on the card. In this way, all the information is immediately available to the customer without the need to turn to a salesman. With this display, the customer can make a decision on whether or not to purchase, more quickly. The customer can serve himself by simply taking down the article so packed from the display shelf. Due to these attractive characteristics, blister type packing is widespread in stores: it has the advantages of distribution in bulk without the drawbacks of loose display.

The articles displayed in such receptacles might have been packed previously by the manufacturer. Such is the case for film cartrigdes or cassettes which arenormally packed in cardboard boxes having printed thereon various film characteristics intended for the customer's information. Very often the cardboard box also bears coded information used by the manufacturer for automatic identification of the article. For this purpose manufacturers often use bar codes which can be read automatically by opto-electric means, such as scanners with photodiode bar or light pens.

Of course, when such an article is repacked in a blister pack for distribution on display shelves, the bar codes remain perfectly readable through the transparent shell which wraps the article.

Very often, the distributor of the whole receptacle blister/article uses another bar code for managing this product from its entry into stock to its sale to customers. This bar code which is printed for example on the support card of the transparent shell, is used by employees at the point of sale to locate the identification code of the whole. Thus, the employees are faced with products bearing two different bar codes, one relating to the individual articles, the other relating to the whole pack. Very serious errors can result from the reading of the bar code printed on the article instead of the one corresponding to the whole pack. To avoid any confusion, it is necessary to mask the bar codes of the individual articles for example with an auto-adhesive label stuck on the bar code, before repacking the article in a blister pack, a task which requires expensive additional handling.

Thus, the object of the present invention is to make a blister type receptacle for displaying articles bearing bar codes; this receptacle prevents any confusion between the code on the article and another bar code borne by the receptacle itself, this protection requiring no expensive additional handling of the article.

This object of the invention is attained with a receptacle comprising a transparent area covering information readable by opto-electronic devices, which is borne by an article contained in the receptacle, characterized in that the section of the transparent area which faces the area of the article bearing information readable by opto-electric devices, has deformations which serve to distort the reading of this information through this transparent area.

Figure 2:
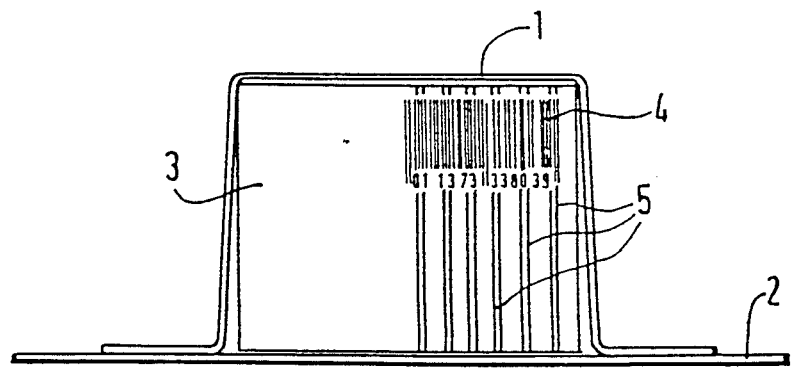

In the attached drawing given only by way of example:

FIG. 1 is a plan view of a receptacle according to the present invention for displaying an article bearing a bar code; and FIG. 2 is a face view of the receptacle represented in FIG. 1 which represents the article so displayed and the bar code borne by this article.

Reference is made now to FIGS. 1 and 2 wherein it appears that the receptacle according to the invention is essentially comprised of two aprts, wrapping 1 of transparent plastics and support card or support plaque 2, for example of fiberboard. Transparent wrapping 1 is shell-shaped and provides a housing for article 3, which bears bar codes 4 on its outer surface. By way of non-limiting example, article 3 is a parallelipiped box containing a cartridge, or a cassette of photographic or cinema film.

The shell is fixed on card 2 with glue, staples or by thermosealing or any other appropriate means. In particular, it is easy to make a shell by thermoforming a transparent plastics sheet and to have the card itself covered with plastics film, both plastics being thermosealable together. The filled receptacle of articles can be hung on a crook on the display shelf, by buttonhole 6 pierced in card 2.

If the whole receptacle/article is itself identified by a printed bar code, for example on support card 2 of the whole, code 4 borne by the article has to be masked. According to a conventional technique, bar code 4 borne by the article is masked, before packaging under blister, by means of an auto-adhesive label of dimennsions sufficient to cover the coded area. The reading of this bar code instead of another bar code identifying the whole receptacle/article is thus avoided. Unfortunately, for current articles such as film boxes, such an operation can turn out to be very expensive.

According to the present invention, this difficulty is overcome by using shell 1 provided, at least in the area of the shell facing the bar code of the article, with deformations which serve to distort the reading of this bar code through these deformations. In this way, an operator provided for example with a light pen, and trying to find again a piece of information relating to management (such as an identification code of the whole film box/receptacle) by moving the light pen across code 4 reads distorted information, rendered incoherent. Thus the operators detects the error and then looks for another bar code on the receptacle, the one bearing the infomration searched, and being readable.

According to an embodiment of the present invention distortion is obtained by means of cylindrical ribbings 5 parallel to code bars 4 for optimum efficiency. These ribbings result from the same moulding or thermoforming as entire shell 1 and therefore, their fabrication does not incur any extra expense. The bar code image transmitted by those ribbings is deformed by cylindrical lens effect resulting in variations in spacing and width of the code bars, at least locally. The code is rendered unreadable, and thus cannot be confused with the bar code of the whole article/receptacle.

The receptacle according to the present invention has the advantage of distorting the code relating to the article without any additional operation. From this point of view it is thus very inexpensive. This solution is also very efficient, as it has been verified in particular for bar codes of types known as EAN or UPC.

The present invention can be extended to several variants of the receptacle above described. The ribbings can be extended to a wider area of the shell, for aesthetical grounds of for ensuring the distortion of the bar code, whatever the positioning of box 4 and thus the positioning of code 4 should be, inside the shell. The deformations can also take shapes different from ribbings as far as they allow to produce the desired effect, i.e. the distortion of the bar code.

This invention can be extended, in general, to any receptacle exhibiting at least one transparent part through which it is possible to read by opto-electronic means information relating to the article contained in the receptacle which has not to be read when the article is displayed. The present invention can be extended in particular to any receptacle of blister type, whatever the form of the transparent part of the receptacle should be, this form resulting from the shape of the article protected or from any other practical or aesthetical factor.

I claim:

1. An article display assembly comprising a receptacle and an article bearing information readable by opto-electronic devices, the receptacle including a transparent part covering the said information, characterised in that the transparent part exhibits deformations appropriate for distorting the reading of information therethrough, such deformations being located to face the area of the article which bears said opto-electronically-readable information.

2. An article display assembly according to claim 1 characterised in that the information readable by opto-electronic devices is a bar code.

3. An article display assembly according to claim 2 characterised in that the transparent part is formed of a sheet bearing information deformations in the form of ribbings, facing the area of the article bearing the bar code.

4. An article display assembly according to claim 3 characterised in that the ribbings are rectilinear and parallel to the bars of the code.

5. An article display assembly according to claim 4 characterised in that the receptacle includes a bar code readable by opto-electronic devices.

6. An article display assembly according to any one of claims 1 to 5 characterised in that the article is a box of photographic or cinema film.

* * * * *

UNITED STATES PATENT AND TRADEMARK OFFICE
CERTIFICATE OF CORRECTION

PATENT NO.   : 4,850,488
DATED        : July 25, 1989
INVENTOR(S)  : B. M. M. Humbert It is certified that error appears in the above-identified patent and that said Letters Patent is hereby corrected as shown below:

On the title page:

Item [30] Foreign Priority "[JP] Japan 61-4423"

should be --[FR] France 8604423--.

Signed and Sealed this

Thirty-first Day of July, 1990

Attest:

HARRY F. MANBECK, JR.

Attesting Officer    Commissioner of Patents and Trademarks